Nov. 14, 1967   H. GRIGULL   3,351,983
APPARATUS FOR INJECTION MOLDING
Original Filed Oct. 7, 1963   2 Sheets-Sheet 1
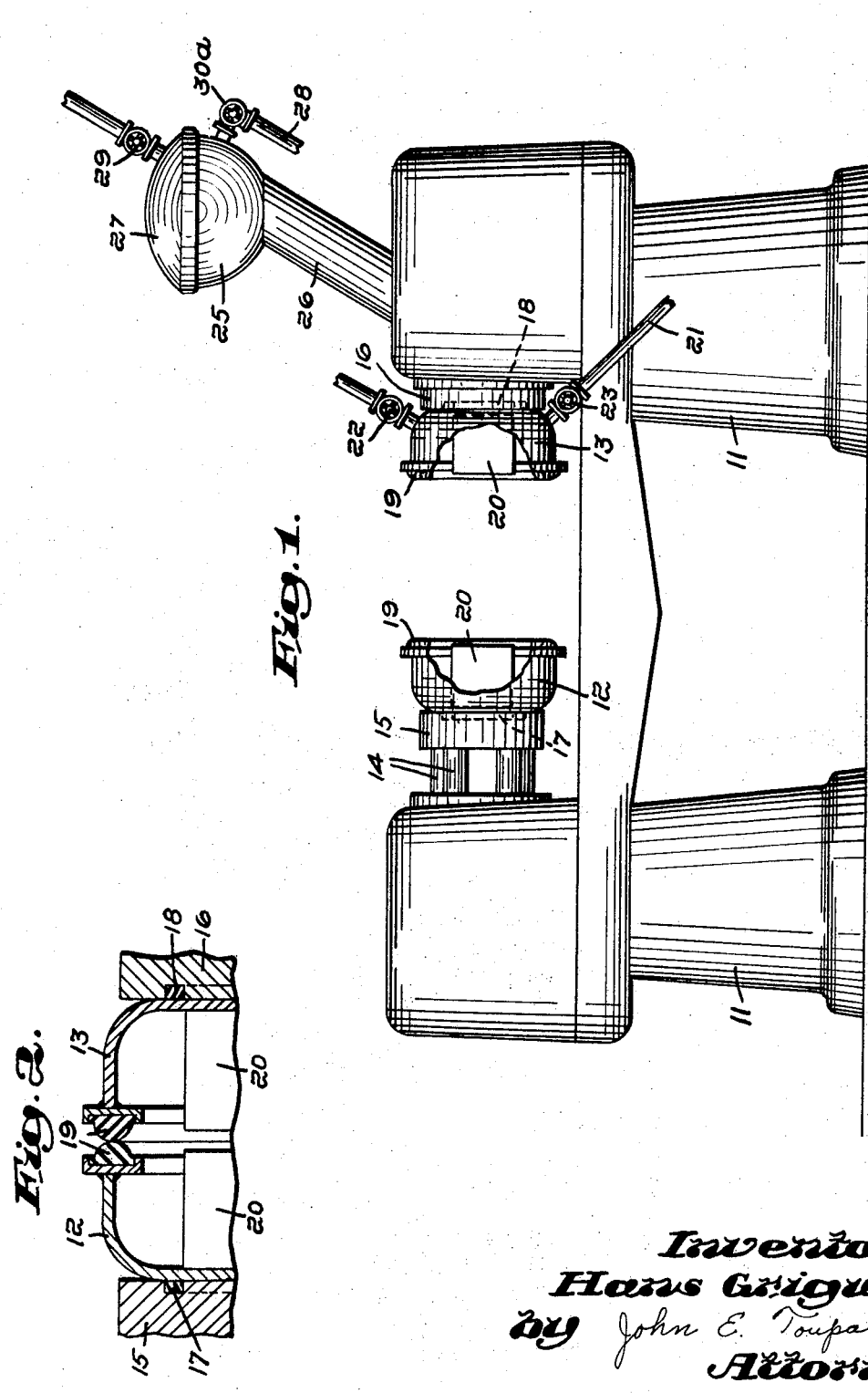
Inventor:
Hans Grigull,
by John E. Toupal
Attorney

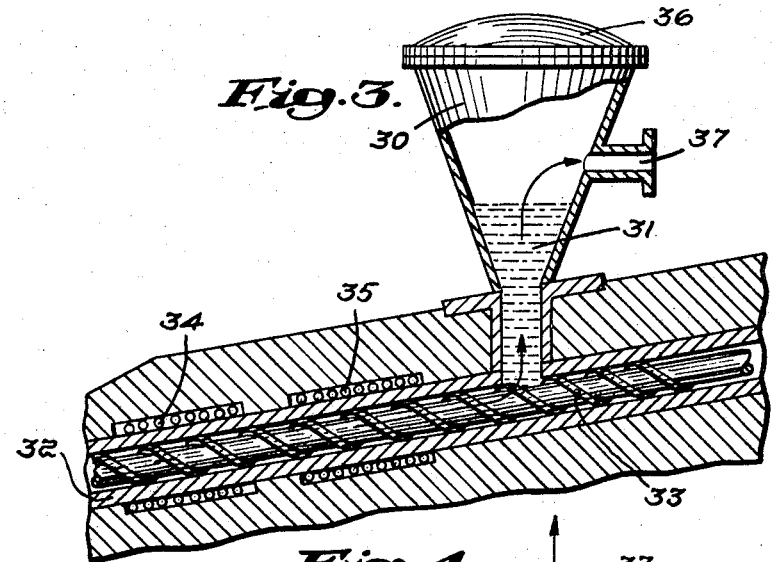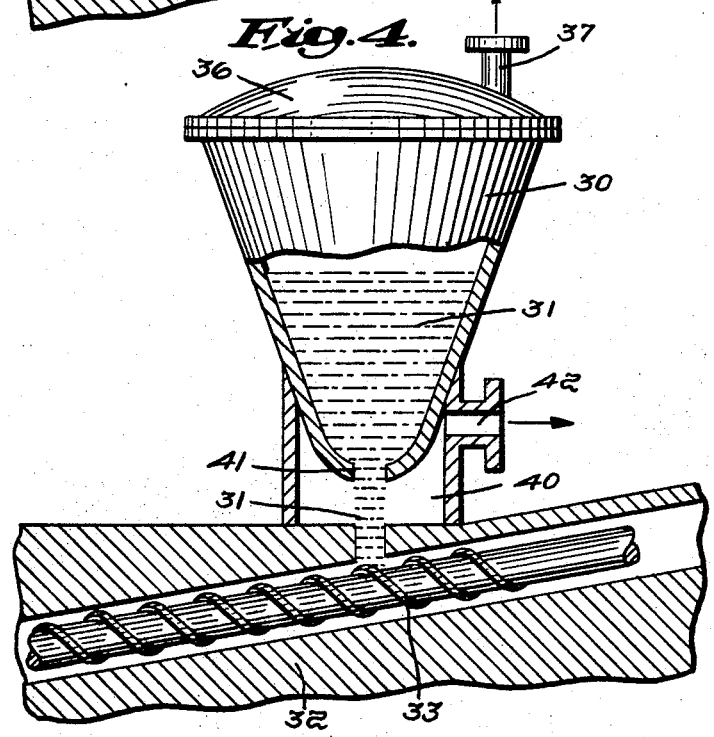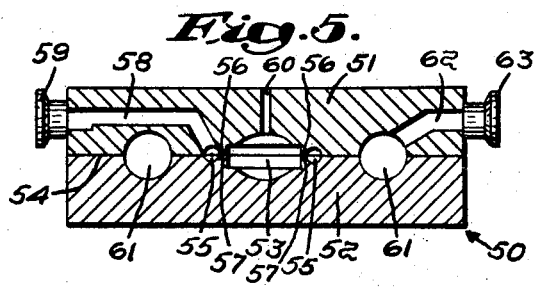

United States Patent Office 3,351,983
Patented Nov. 14, 1967

3,351,983
APPARATUS FOR INJECTION MOLDING
Hans Grigull, Cologne-Ehrenfeld, Germany, assignor to Leybold Holding AG, Zug, Switzerland, a Swiss joint-stock company
Continuation of application Ser. No. 315,856, Oct. 14, 1963. This application May 23, 1966, Ser. No. 562,024
Claims priority, application Germany, Oct. 12, 1962, L 43,193; May 31, 1963, L 45,002
12 Claims. (Cl. 18—30)

ABSTRACT OF THE DISCLOSURE

Molding apparatus includes support structure carrying casting molds in confronting relation, the casting molds being mounted on hydraulically-operated shafts for the purpose of closing and opening. A molding material supply apparatus is associated with the support structure for one of the mold halves. This supply structure includes a screw conveyor which is surrounded in part by heating coils, for carrying granular material, which is plasticized by the heating coils, toward the mold injection jet. The granular material is fed to the conveyer by gravity from a bottom port in a supply vessel or hopper having a vacuum tight cover, the hopper being evacuable to degas the granular material therein. In an alternative structure, an intermediate chamber is provided between the hopper and conveyer for connection to a vacuum source to effect further degassing of the falling material; and gases given off during the plasticizing may pass through the conveyer to this chamber to be evacuated. In one form of mold structure, the casting molds include outer structures which engage each other first to define an outer chamber which is then evacuated by means of a vacuum pump. The casting chamber is then effectively evacuated during the closing of the members defining the casting chamber; and an evacuated guard chamber then surrounds the casting chamber. Another form of casting mold includes two mating halves which define a central mold cavity and an inner annular surrounding cavity which is connected to the mold cavity by a slit-shaped opening at the parting line, to provide a gas conductance path therebetween. This inner chamber is evacuable to evacuate the mold cavity prior to the admission of the molding material. An outer annular chamber is also formed along the parting line of the mold halves and defines an evacuable guard chamber for providing a region of intermediate pressure between the molding cavity and the surrounding atmosphere.

---

This is a continuation of application Ser. No. 315,856 filed Oct. 14, 1963, and now abandoned.

This invention relates generally to injection molding apparatus and more particularly to apparatus for vacuum injection molding.

Injection molding is a well-known method of producing objects of pliable materials, such as, for example, thermoplastic polymerates. With this process, however, errors may occur during the molding which cause a quality reduction of the finished part.

Parts can exhibit, for example, air bubbles, scorched spots, seam errors, etc. The errors are caused by air pockets remaining in the mold after injection of the molding material. A very tight mold aggravates the problem by preventing escape of trapped air during the molding process. Air cushions cause an incomplete flow of the injection material into the mold, thereby producing air bubbles in the product. Also, such air cushions can be locally heated by the injection pressure to such an extent that scorched areas will occur in the finished product.

Another problem is the production of seam faults in the product if the injected mass cools unequally. The material in the mold must be heated to the thermal limit in order to reduce the viscosity. If then the mold is very tight at its joints, the enclosed air can not escape easily, which leads to an unequal cooling of the injected material. During the meeting of masses at different temperatures visible seams can occur.

To avoid the above difficulties, apparatus was developed for injecting the casting material into a mold under reduced pressure. In spite of mold evacuation, however, the molded product can still exhibit water inclusions if the granular material used for the injection has been stored for an extended time in a high humidity. During the casting process these water inclusions can produce bubbles, which have similar adverse effects on the quality of the finished product.

To alleviate this second problem and to obtain a bubble-free product, attempts have been made to degas the injection material before casting. Heretofore, however, the degassing occurred after the raw material (such as, for example, a granulate or powdered substance) had already been exposed to the influence of heat and had become plastic. Therefore, only those gases which were liberated during the heating process were removed. Frequently as the molding material becomes plasticized, the decreased diffusivity of the contained moisture prevents adequate removal thereof. Thus the disadvantages of casting with humid material are not avoided.

The object of this invention, therefore, is to provide an injection molding apparatus which will consistently and economically produce uniform and fault-free molded products.

One feature of this invention is the provision of vacuum injection molding apparatus which completely degasses and dries the molding material prior to the molding operation.

Another feature of this invention is the provision of molding apparatus of the above-featured type wherein drying and degassing of the molding material occurs before the material has been plasticized and injected into the casting mold.

Another feature of this invention is the provision of an injection molding apparatus of the above-featured type which includes a vacuum-tight heating zone for plasticizing the molding material before injection into the casting mold, a molding material storage vessel, and an intermediate vacuum chamber adapted for degassing and drying the molding material before its injection into the heating zone.

Another feature of this invention is the provision of injection molding apparatus of the above-featured type wherein said molding material storage vessel is a vacuum chamber and including evacuation devices for reducing the pressure in the molding material storage vessel and the intermediate vacuum chamber.

Another feature of this invention is the provision of a vacuum sealable injection mold which is adapted for opening to allow removal of a finished product and wherein the parting line of the sealable mold is surrounded by an additional vacuum chamber adapted to prevent leakage of air into the molding space.

Another feature of this invention is a provision of an injection mold of the above-featured type which includes an evacuation mechanism for the vacuum sealable molding chamber and a separate and independent evacuation mechanism for the surrounding guard vacuum chamber.

These and other objects and features of the present invention will become more apparent upon a perusal of the following specification taken in conjunction with the accompanying drawings wherein:

FIG. 1 is a front view of a vacuum injection molding apparatus according to the present invention;

FIG. 2 is a partial enlarged cross-sectional view of the casting mold shown in FIG. 1;

FIG. 3 is a partial cross-sectional view of a preferred molding material supply vessel and conveyor tube embodiment;

FIG. 4 is a partial cross-sectional view of another preferred molding material supply vessel and filling tube embodiment; and FIG. 5 is a cross-sectional view of a preferred vacuum guarded casting mold embodiment of the present invention.

Referring now to FIGS. 1 and 2, there is shown an injection molding device supported on a pair of opposed substantially identical mold supports 11. The mounting blocks 15, 16 and attached casting molds 12, 13 are supported from the mold supports 11 by the hydraulically operated shafts 14 in a manner to allow simple interchangeability of particular mold forms. The O-ring seals 17, 18 provide a vacuum seal between the interiors of hollow mounting blocks 15, 16 and the casting molds 12, 13. The opposing casting molds 12, 13 are aligned so that upon activation of the hydraulically operated shafts 14 they will come into contact along the opposing annular rubber sealing elements 19 as shown in FIG. 2. In this way a vacuum-tight seal is formed around the portions 20 of the molds 12 and 13, which define the mold cavity, and the surrounding annular chamber 20a.

Communicating with the annular chamber 20a in the mold 13 is an evacuation line 21 adapted for connection to a suitable pumping device (not shown). Valve 22 allows atmospheric venting of the closed casting molds 12, 13, and a valve 23 in the evacuation line 21 permits opening and closing thereof.

Mounted above one mold support 11 is a molding material supply vessel 25 connected to a molding material conveyor 26. The conveyor 26 is adapted to convey molding material to an injection jet (not shown), which injects the material into the mold cavity of the closed molds 12, 13. The supply vessel 25 includes a vacuum sealable cover 27 and an evacuation line 28 adapted for connection to a suitable vacuum pumping device (not shown). Venting valve 29 allows venting of the supply vessel to atmosphere, and the valve 30a allows opening and closing of the evacuation line 28.

To produce molded objects with the apparatus shown in FIG. 1, the supply vessel 25 is filled with a suitable raw material and then closed with the vacuum-tight cover 27. Valve 30a is opened, and the supply vessel 25 is evacuated through the evacuation line 28, thereby removing moisture and gas from the molding material.

The hydraulically operated shafts 14 are actuated causing the casting molds 12, 13 to meet initially along the opposing annular seals 19, which form a vacuum-tight seal. The mold cavity defined by the mold portions 20 and the annular surrounding chamber 20a are then evacuated to a pressure of about 1 torr via open valve 23 in the evacuation line 21. Further movement of the molds 12, 13 produces compression of the gaskets 19 and contact of the mold portions 20 along their mating parting surfaces 20b. Thus the mold cavity formed by the mold portions 20 is isolated from surrounding annular chamber 20a and evacuation line 21. Degassed molding material is then fed into the evacuated mold cavity formed by mold portions 20 through the molding material conveyor 26. After the mold cavity is completely filled and the casting operation completed, the venting valve 22 is opened allowing atmospheric pressure into the annular chamber 20a. This permits the shafts 14 to be easily retracted separating the casting molds 12, 13. The finished article is then removed from the mold cavity 20.

Referring now to FIG. 3, there is shown a preferred supply vessel and conveyor embodiment for use in apparatus of the type shown in FIG. 1. The supply vessel 30 is filled with a molding material 31 such as, for example, a powder or granular plastic material, which is directed through the conveyor tube 32 into the mold cavity. The conveyor tube 32 encloses a material conveyor screw 33, which pushes material through the tube and is surrounded by heating coils 34, 35. The supply vessel 30 is closed off in a vacuum-tight manner by the flanged cover plate 36; and includes in its upper portion a flanged tubing 37, which is adapted for connection to a vacuum pump (not shown).

As shown in the embodiment of FIG. 3, the molding material 31 can be thoroughly degassed before entry into the conveyor tube 32 by evacuating the supply vessel 30 through the flanged tubing 37. The conveyor screw 33 then pushes degassed material through the conveyor tube 32 toward the mold injection jet (not shown). As the material passes through the area enclosed by heating coils 34, 35, it becomes plasticized; and any additional gases evolved during this operation will be withdrawn (as shown by the arrows) through the material in supply vessel 30.

FIG. 4 shows another molding material supply vessel embodiment which is preferable when a higher degree of material degassing is desired. Parts of this embodiment which are similar to those in FIG. 1 are given the same reference numerals. In this embodiment the supply vessel 30 is supported by and empties into an intermediate vacuum chamber 40. The cross-section of the intermediate vacuum chamber 40 is greater than that of an opening 41 in the bottom of supply vessel 30. Thus molding material 31 from the supply vessel 30 falls freely through the intermediate vacuum chamber 40 into the conveyor tube 32. An additional flanged evacuation tube 42 is connected for gas communication with the intermediate vacuum chamber to provide for evacuation thereof.

In this embodiment desired amounts of initially degassed molding material 31 are intermittently released from the supply vessel 30 by conventional methods such as, for example, stirring, shaking, valve operations, etc. As the material falls through the evacuation intermediate chamber 40, a further and more thorough degassing takes place. Also, the gases released by the heating operations of heating coils 34, 35 are more easily removed through the evacuation tube 42, since it is unnecessary in this embodiment to pump such gases through the reduced conductance provided by the material remaining in the supply vessel 30.

FIG. 5 shows a preferred vacuum casting mold embodiment for use in the same manner as casting mold halves 12, 13 shown in FIG. 1. The casting mold 50 consists of two mating halves 51, 52, which join to form a mold cavity 53. The cavity 53 is surrounded along the parting line 54 of the mating halves 51, 52 by an annular vacuum chamber 55, which is formed by grooves therein. The cavity 53 and annular vacuum chamber 55 are separated by thin walls 56 formed in the mold halves 51, 52. Slit-shaped openings 57 in the walls 56 provide a gas conductance path between the vacuum chamber 55 and the cavity 53. A passage 58 in mold half 51 joins the vacuum chamber 55 and the flanged connection 59. A molding material injection passage 60 in the mold half 51 communicates with the mold cavity 53. An additional annular outer vacuum chamber 61 is also formed along the parting line 54 of mold halves 51, 52 by grooves therein. The outer vacuum chamber 61 surrounds the inner vacuum chamber 55 and is connected via another passage 62 in the mold half 51 to a flanged piping connection 63.

In this embodiment it is preferable to have the volume of outer vacuum chamber 61, which performs as a guard vacuum chamber, substantially larger than that of the inner vacuum chamber 55 surrounding the mold cavity 53. Also, the inner vacuum chamber 55 is preferably shaped in conformance with the shape of the mold cavity 53.

When molding with the embodiment of FIG. 5 the vacuum chamber 61 is first evacuated to a pressure of the order of 20 to 30 torr, and the vacuum chamber 55 is evacuated to a pressure of approximately 1 torr. Molding material is then injected into the mold cavity 53 through the injection passage 60. Upon completion of the process, the mold halves 51, 52 are separated and the finished product removed from the mold cavity.

Thus the outer guard vacuum chamber 61 continuously maintains, during the molding operation, a region of intermediate pressure between the molding cavity 53 and the surrounding atmosphere. This serves two desirable functions. The guard vacuum chamber 61 prevents leakage from atmosphere into the mold cavity 53 along the parting line 54 of mold halves 51, 52. Such leakage would increase the pressure within mold cavity 53 and correspondingly reduce the quality of the finished product for reasons described above.

In addition the guard vacuum chamber 61 insures a molded product of uniform quality. This is accomplished by maintaining for each molding operation a uniform gas load at the evacuation passage 58 and thereby a uniform pressure within mold cavity 53. The gas load within the mold cavity 53 and intermediate chamber 55 is formed by gas released from the molding material injected through injection passage 60 and by leakage into the mold cavity 53 along the parting line 54 of mold halves 51, 52. The guard vacuum chamber 61 reduces this leakage to such an extent as to render its effect negligible, thereby establishing substantially uniform conditions.

Obviously many modifications and variations of the present invention are possible in light of the above teachings. It is, therefore, to be understood that within the scope of the appended claims the invention may be practiced otherwise than as specifically described.

What is claimed is:

1. An injection molding apparatus comprising: an injection mold including separable mold halves having mating faces defining a mold cavity, mold evacuation means for evacuating said mold cavity; a supply vessel adapted to contain a supply of molding material, means for vacuum sealing said molding material supply vessel, vessel evacuation means for evacuating said supply vessel; vacuum-tight conveyor means for guiding molding material from said supply vessel into said mold cavity, heating means positioned in the vicinity of said conveyor means providing within said conveyor means a heating zone for rendering the molding material into a pliable state before injection thereof into said mold cavity; a degassing vacuum chamber positioned in the path of the molding material between said supply vessel and said conveyor means, chamber evacuation means for evacuating said degassing vacuum chamber, said degassing vacuum chamber being positioned below said supply vessel, the lower portion of said supply vessel having an aperture adapted to permit the dropping of molding material into said degassing vacuum chamber, said degassing vacuum chamber having a larger cross section than that of the aperture in said supply vessel thereby insuring the free fall of molding material through said degassing vacuum chamber; said separable mold halves having means in said mating faces defining a guard vacuum chamber surrounding said mold cavity, said mating faces having parting surfaces defining a wall separating said guard vacuum chamber from said mold cavity with the injection mold in a closed position, and guard vacuum evacuation means independent of said mold evacuation means for evacuating said guard vacuum chamber.

2. Apparatus according to claim 1 wherein the mating faces of said separable mold halves having means defining an intermediate vacuum chamber between said guard vacuum chamber and said mold cavity and means providing a path for gas communication between said mold cavity and said intermediate vacuum chamber.

3. An injection molding apparatus comprising: an injection mold including separable mold halves having mating faces defining a mold cavity, mold evacuation means for evacuating said mold cavity; a supply vessel adapted to contain a supply of molding material, means for vacuum sealing said molding material supply vessel, vessel evacuation means for evacuating said supply vessel; vacuum-tight conveyor means for guiding molding material from said supply vessel into said mold cavity; a degassing vacuum chamber positioned in the path of the molding material between said supply vessel and said conveyor means, chamber evacuation means for evacuating said degassing vacuum chamber, said degassing vacuum chamber being positioned below said supply vessel, the lower portion of said supply vessel having an aperture adapted to permit the dropping of molding material into said degassing vacuum chamber, said degassing vacuum chamber having a larger cross-section than that of the aperture in said supply vessel thereby insuring the free fall of molding material through said degassing vacuum chamber; said separable mold halves having means in said mating faces defining a guard vacuum chamber surrounding said mold cavity, said mating faces having parting surfaces defining a wall separating said guard vacuum chamber from said mold cavity with the injection mold in a closed position, and guard vacuum evacuation means independent of said mold evacuation means for evacuating said guard vacuum chamber.

4. Apparatus according to claim 3 wherein the mating faces of said separable mold halves have means defining an intermediate vacuum chamber between said guard vacuum chamber and said mold cavity and means providing a path for gas communication between said mold cavity and said intermediate vacuum chamber.

5. An injection molding apparatus comprising: an injection mold, including separable mold halves having mating faces defining a mold cavity, mold evacuation means for evacuating said mold cavity; a supply vessel adapted to contain a supply of molding material, means for vacuum sealing said molding material supply vessel, vessel evacuation means for evacuating said supply vessel; vacuum-tight conveyor means for guiding molding material from said supply vessel into said mold cavity; said separable mold halves having means in said mating faces defining a guard vacuum chamber surrounding said mold cavity, said mating faces having parting surfaces defining a wall separating said guard vacuum chamber from said mold cavity with the injection mold in a closed position, and guard vacuum evacuation means independent of said mold evacuation means for evacuating said guard vacuum chamber.

6. Apparatus according to claim 5 including heating means positioned in the vicinity of said conveyor means providing within said conveyor means a heating zone for rendering the molding material into a pliable state before injection thereof into said mold cavity.

7. Apparatus according to claim 5 wherein the mating faces of said separable mold halves having means defining an intermediate vacuum chamber between said guard vacuum chamber and said mold cavity and means providing a path for gas communication between said mold cavity and said intermediate vacuum chamber.

8. Apparatus according to claim 7 including heating means positioned in the vicinity of said conveyor means providing within said conveyor means a heating zone for rendering the molding material into a pliable state before injection thereof into said mold cavity.

9. An injection molding apparatus comprising
an injection mold including separable mold halves having mating faces defining a mold cavity; mold evacuation means for evacuating said mold cavity;
said separable mold halves having means in said mating faces defining a guard vacuum chamber surrounding said mold cavity, said mating faces having parting surfaces defining a wall separating said guard vacuum chamber from said mold cavity with the injection mold in a closed position; and guard vacuum evacuation means independent of said mold evacuation means for evacuating said guard vacuum chamber.

10. Apparatus according to claim 9 wherein the mating faces of said separable mold halves have means defining an intermediate vacuum chamber between said guard vacuum chamber and said mold cavity and means providing a path for gas communication between said mold cavity and said intermediate vacuum chamber.

11. A molding apparatus comprising
separable mold halves having mating faces positioned adjacent to each other in the closed position of the mold halves; said mating faces having means defining, in the closed position of said mold halves, an inner mold cavity and an outer chamber surrounding said mold cavity;
passage means in at least one of said mold halves for communicating said outer chamber with evacuation means;
outer sealing means disposed on said mating faces surrounding said outer chamber, for sealing said outer chamber and said mold cavity from the surrounding atmosphere; parting surface means disposed on said mating faces defining a separating wall between said mold cavity and said outer chamber; and said outer sealing means being disposed for sealing engagement, upon movement of said mold halves to the closed position, prior to the closing of said parting surface means to effect the evacuation of said mold cavity prior to its closing.

12. Apparatus according to claim 9
wherein said outer sealing means include a compressible member which effects the sealing of said outer sealing means upon movement of said mold halves to the closed position, and which permits subsequent additional movement of the mold halves to close said parting surface means and said mold cavity.

References Cited

UNITED STATES PATENTS

| | | | |
|---|---|---|---|
| 2,304,461 | 12/1942 | Knowles. | |
| 2,422,809 | 6/1947 | Stupakoff et al. | 264—329 |
| 2,566,596 | 9/1951 | Cantor | 264—102 |
| 2,666,949 | 1/1954 | Slankewich. | |
| 2,668,985 | 2/1954 | Babbitt. | |
| 2,959,900 | 11/1960 | Wollett | 264—102 |
| 3,089,199 | 5/1963 | Halacsy | 264—272 |

FOREIGN PATENTS

| | | |
|---|---|---|
| 925,502 | 5/1963 | Great Britain. |

J. SPENCER OVERHOLSER, *Primary Examiner.*

WILBUR L. McBAY, *Examiner.*